United States Patent [19]

Bandar

[11] 4,342,557
[45] Aug. 3, 1982

[54] DEVICE FOR TYING DOUBLE BOW KNOT

[76] Inventor: Lesley F. Bandar, 53 Pleasant View Rd., Arlington, Mass. 02174

[21] Appl. No.: 271,504

[22] Filed: Jun. 8, 1981

[51] Int. Cl.³ .............................................. G09B 19/00
[52] U.S. Cl. ...................................... 434/260; 289/1.5
[58] Field of Search ............................ 24/240; 28/147; 40/20 R, 401; 281/50; 282/29; 283/18, 19, 20; 289/1.5, 15, 18.1; 434/260

[56] References Cited

U.S. PATENT DOCUMENTS

| 1,308,792 | 7/1919 | Leitch | 40/20 R |
| 1,362,328 | 12/1920 | Knorr | 283/18 |
| 1,853,790 | 4/1932 | Westcott | 434/260 |
| 1,888,704 | 11/1932 | Swett | 40/20 R |
| 2,385,197 | 9/1945 | Eisel | 434/260 |
| 2,799,104 | 7/1957 | Griesinger | 40/20 R |
| 3,292,632 | 12/1966 | Hopen | 40/401 X |
| 4,254,566 | 3/1981 | Haskell | 40/20 R X |

FOREIGN PATENT DOCUMENTS 477321 12/1937 United Kingdom ............... 40/20 R

Primary Examiner—Harland S. Skogquist
Attorney, Agent, or Firm—Dahlen & Gatewood

[57] ABSTRACT

A device is provided which can be used as an educational means for teaching young children how to tie a double bow knot, particularly in their shoe laces, or as an aid to the handicapped child lacking sufficient manual dexterity in tying such a knot. Basically the device is a planar body member in which is provided two pairs of spaced-apart openings in alignment with one another, the two intermediate openings being connected by a narrow opening or slit. The device allows "bunny ear" loops to be formed in the intermediate spaced-apart openings and to form the double bow knot by making a simple overhand knot with the two "bunny ear" loops.

6 Claims, 8 Drawing Figures

DEVICE FOR TYING DOUBLE BOW KNOT

BACKGROUND OF THE INVENTION

1. Field of the Invention

The invention relates to a device for assisting one in tying a double bow knot. It particularly relates to an educational device for teaching a young or handicapped child to tie his shoes.

2. Description of the Prior Art

Tying knots requires considerable manual dexterity in addition to understanding of the steps involved in tying a particular knot. Learning to tie a double bow knot as is required in tying one's shoe laces is a difficult task for a young child. And teaching the child to tie such a knot is not only difficult but frustrating as well, as any parent well knows.

In tying a double bow knot in one's shoe laces, one must first manipulate the lace ends to form a simple overhand knot, next a so-called "bunny ear" loop is then formed with one of the ends and that loop is held while manipulating the other end to form a second loop. The two bunny ear loops are then pulled in opposite directions to one another to complete the knot.

Most children are capable after a short time to make the initial knot, that is the rather simple overhand knot. However, some children, particularly those who are handicapped in one way or another, have a rather difficult time in understanding and mastering the formation of the double bow knot. As a result, some children depend for a rather long time on others, e.g., an older brother or sister, a parent, or even a teacher to tie his shoe laces.

Where the child is handicapped, the tying of one's shoe laces may be difficult and frustrating at any age. A primary difficulty lies not only in understanding and mastering the principal of tying the double bow knot, but also in the lack of manual dexterity to form a loop in the one end of the lace, and to hold it in one hand, while manipulating the other end of the shoe lace with the other hand to form a second loop, and ultimately the double bow knot.

Over the years, various teaching aids and learning devices have been developed as an aid in teaching children how to tie certain knots. One such a device is disclosed in U.S. Pat. No. 2,624,957. In that patent, the educational device disclosed acts as an instrumentality for teaching a child how to tie various common knots, including the double bow knot. However, the device can not be used to assist a child in tying his own shoe laces. It merely provides facility in the tying of knots.

U.S. Pat. No. 4,017,984 discloses an educational device for teaching one to lace and tie shoes. Basically the device comprises a pair of panel members hingedly secured on a base to simulate the side flaps of a lace-up shoe. The ends of the shoe laces used are differently colored to match certain eyelets in the flap whereby the "shoe" is laced by threading the shoe string through eyelets of the same color. Cross-lines of the same colors are placed on the base member to direct crossing of the lace ends and a spot directs placement of a finger to loop the first half of a bow.

Although both of these educational devices disclosed in the prior art are quite useful in teaching not only various common knots but the actual lacing and tying of a shoe, the child still ties these knots on other objects, not his own shoe. Neither of the devices disclosed can be used directly in the tying of one's own shoe laces. As a result, it is sometimes quite difficult for the child, particularly if handicapped in some way, to translate what he has learned to the shoe on his own foot.

SUMMARY OF THE INVENTION

An object of the invention is to provide a simple, economical device useful in helping young or handicapped children in tying double bow knots.

A further object is to provide a device useful in teaching children how to tie a double bow knot in their own shoe laces.

Another object is to provide an educational device or shoe tying aid that can be used directly in the tying of one's own shoe laces.

These and other objects are attained according to the present invention by a device comprising a planar-body member, a first pair of spaced-apart openings in and extending through said body member, an elongated narrow opening in and extending through said body member and connecting said first pair of spaced-apart openings, a second pair of openings spaced-apart a greater distance from one another than said first pair of openings and located on an imaginary line in alignment with said elongated narrow opening, said second pair of openings being located equidistantly on each side of said first pair of openings.

Quite advantageously the invention makes use of the concept involved only in making a rather simple overhand knot in teaching the child to tie the relatively complicated double bow knot. Thus, the tying of this particular knot is made much simpler for the child, and more easily accomplished.

BRIEF DESCRIPTION OF THE DRAWING

The features of the invention will be better understood by reference to the accompanying drawing in connection with reading the specification in which.

DETAILED DESCRIPTION OF THE INVENTION AND THE PREFERRED EMBODIMENTS

Figure 1:
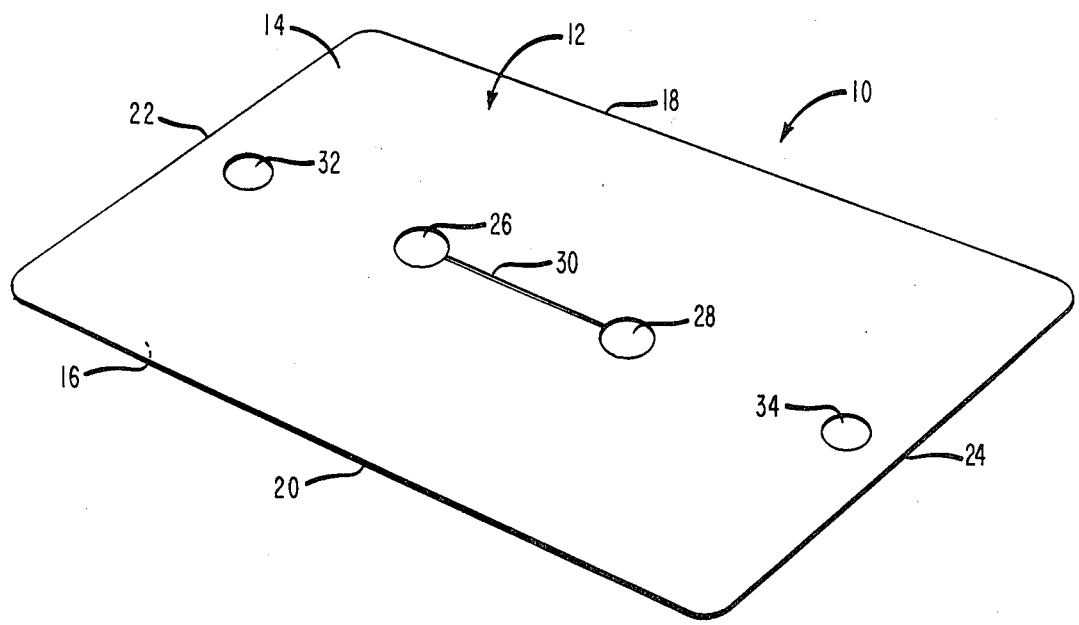
FIG. 1 is a view in perspective of a device according to the invention for assisting one in tying a double bow knot.

Turning now to the drawing there is disclosed in FIG. 1 thereof a device according to the invention indicated generally by reference numeral 10 which, as hereinafter made clear, will be found quite useful in the tying of a double bow knot. Although the disclosure hereinafter as to the use of the invention is primarily directed to the tying of one's shoe laces, it will be appreciated that the device is not limited only to that particular application.

As will be seen from FIG. 1, device 10 comprises a rectangular-shaped body member 12 having a planar upper face 14 and a planar, parallel, lower face 16 defined by parallel longitudinal edges 18,20 and parallel lateral edges 22,24.

Centrally of body member 12, and equidistantly outwardly from the mid-point of the imaginary longitudinal center line of body member 12 are provided a first pair of circular-shaped, spaced-apart openings 26,28 which extend through the body member from upper face 14 to lower face 16. These openings lie on the imaginary longitudinal center line of body member 12 and are connected by a narrow opening or slit 30 which is coincident with that center line.

On the same center line and on opposite sides of the centrally disposed openings 26,28 are provided a further pair of spaced-apart circular-shaped openings 32,34. These openings, like openings 26,28, extend through body member 12. Openings 32, 34 are located equidistant inwardly from respective lateral edges 22,24.

Body member 12 can be provided of various materials, e.g., various plastic materials, paper, cardboard, and even metal. Preferably, however, it will be manufactured of plastic material, e.g., polyvinyl chloride, as a device of this material will be long lasting and not readily destroyed by tearing or the like.

Various of these compositions are well known and obtainable commercially. The polyvinyl chloride compositions, or other plastic material, can include various fillers, etc., to provide the desired stiffness, flexibility, color, etc. The educational aid or device according to the invention can, if desired, be relatively stiff; however, desirably it will have a flexibility somewhat like that of the ordinary plastic playing card.

As shown in the drawing, body member 12 can be of rectangular shape; however, it need not necessarily be of this shape. The body member can be, for example, of square shape or circular. The main requirement is that two pairs of spaced-apart openings be provided in alignment with one another, one pair being spaced farther apart than the other, and that the intermediate pair of openings be not only interconnected together by a slit or narrow opening but also equidistant from respective adjacent outer openings. As will be later appreciated, the edges of the material defining slit 30 need be flexible enough to permit withdrawal of the device once the double bow knot is made.

Preferably, however, device 10 will be of a rectangular-shaped body member, e.g., 3 and ½"×2 and ¼", and of a plastic material, e.g., polyvinyl chloride, that can be readily printed with various indicia and information, as desired. Such a device can be readily die cut from sheet material about 1/64"-1/32" thickness. With such a manner of manufacture, the circular shaped openings can be provided simultaneously at the same time, openings of about ¼" diameter being in general satisfactory to accommodate shoe laces as hereinafter made more clear. However, these openings can be of other than circular shaped if desired, e.g., polygonal. The main requirement is that the openings be only large enough to somewhat snugly accommodate the bunny ear loops formed in making the knot but not too small to make it overly difficult for the child to thread the laces through.

The spacing between the openings can obviously vary somewhat; however, where body member 12 is 3½"×2¼", and the openings are ¼" diameter, the center of circular-shaped openings 32,34 should be located inwardly from respective lateral edges 22,24 about ⅜". And openings 26,28, in such a case, can be about ½'-'–1¼", preferably about ¾", apart, center-to-center. Slit 30 will be no greater than about 1/32" wide; however, this depends to some extent, as does the diameter of the circular-shaped holes, on the size shoe laces involved. Moreover, the more narrow the width of slit 30, the more flexible should be the body member 12.

Figures 2A, 2B, 2C:
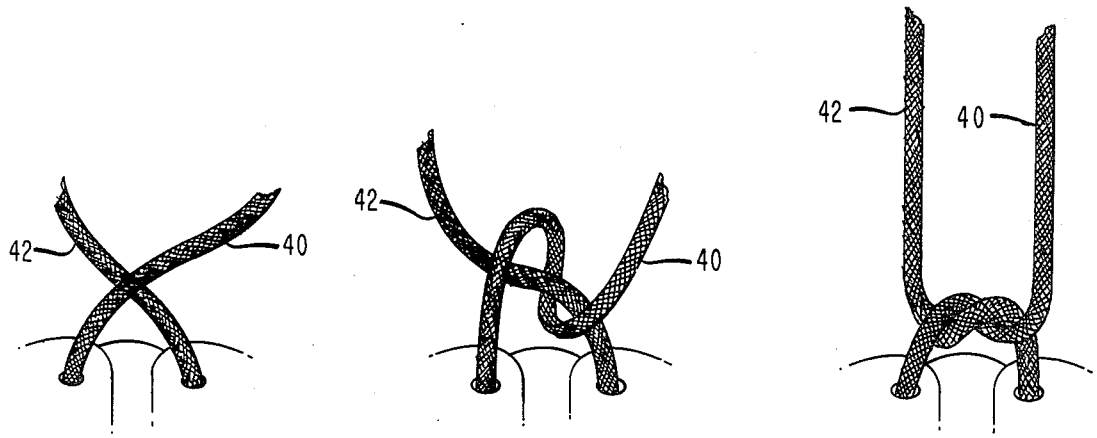
FIGS. 2(a)- 2(c) are schematic views showing the steps involved in tying a simple overhand knot.
Figure 3A:
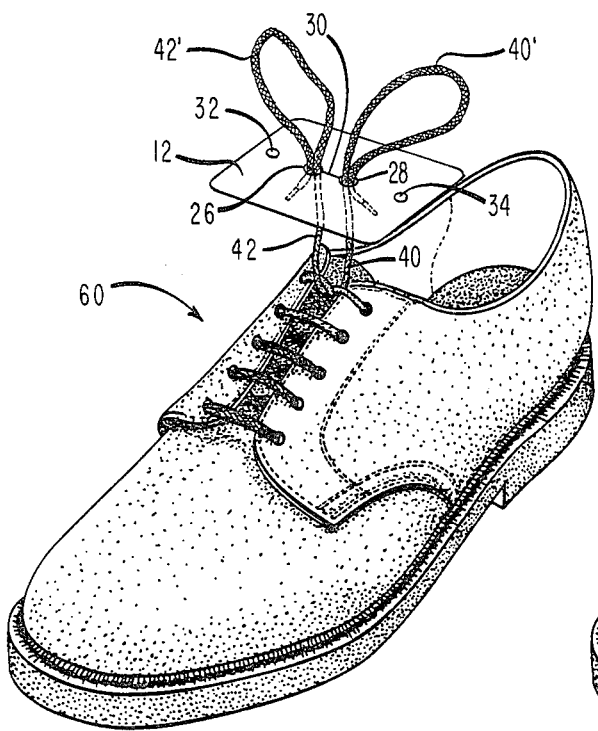
FIGS. 3(a)-3(d) are schematic perspective views showing the use of the device and the steps involved in tying one's shoe lace into a double bow knot.
Figure 3B:
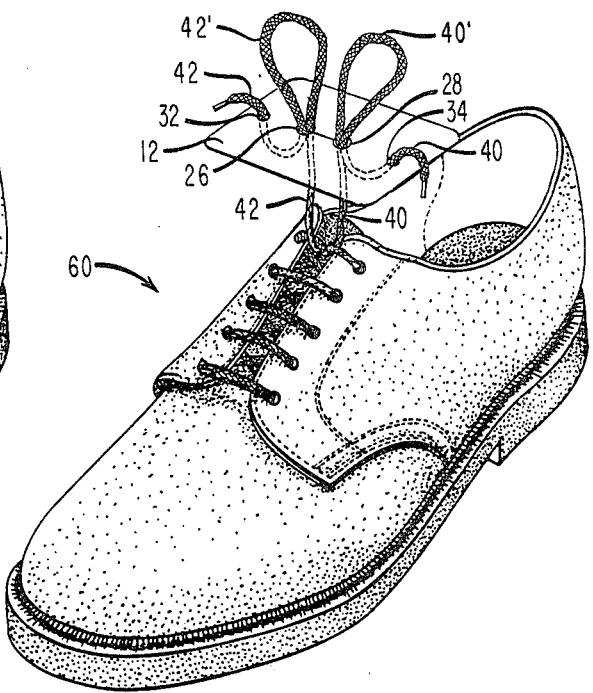

In preparation to use of the educational device 10 of the invention, reference should now be made to FIG. 2 wherein the tying of a simple overhand knot in a shoe lace is shown. The shoe is not shown in these particular figures for sake of clarity in showing the tying of this initial knot. As shown in FIGS. 2(a)-2(c) the first step is to cross shoe lace end 40 over and in front of end 42 (2a); end 40 is then passed over and under end 42 (2b) and finally the two ends 40,42 are pulled in a direction away from one another completing the overhand knot. See FIG. 2(c). At this point, educational device 10 is used to make the double bow knot in the shoe lace. To accomplish this, ends 40,42 (extending from laced-up show 60) are first threaded upwardly through respective openings 26,28 (FIG. 3(a)) in device 12, and back down through the same respective openings, as indicated by the arrows, forming a bunny ear loop 42', 40' in each end. Ends 42,40 are then pulled outwardly toward lateral edges 22,24 and are passed upwardly through respective outer openings 32,34. Thus, the child can see the orientation of the shoe lace ends with respect to their location when the knot is completed. And, most importantly, the child knows when the ends are so located that nothing more need be done with them.

Figure 3C:
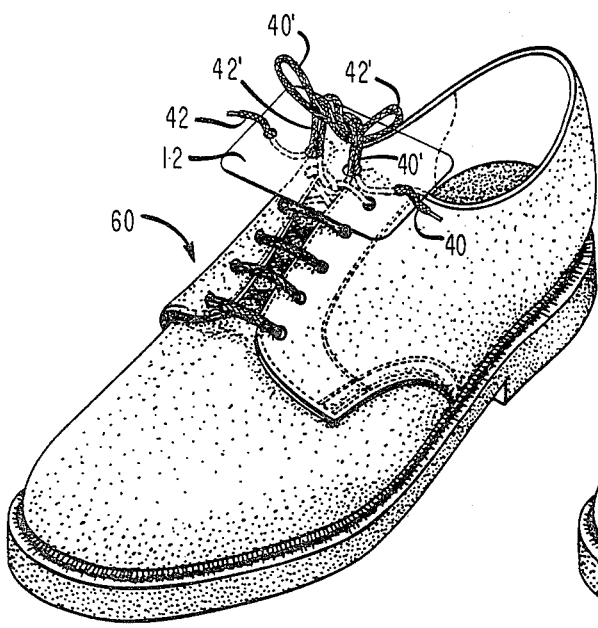
Figure 3D:
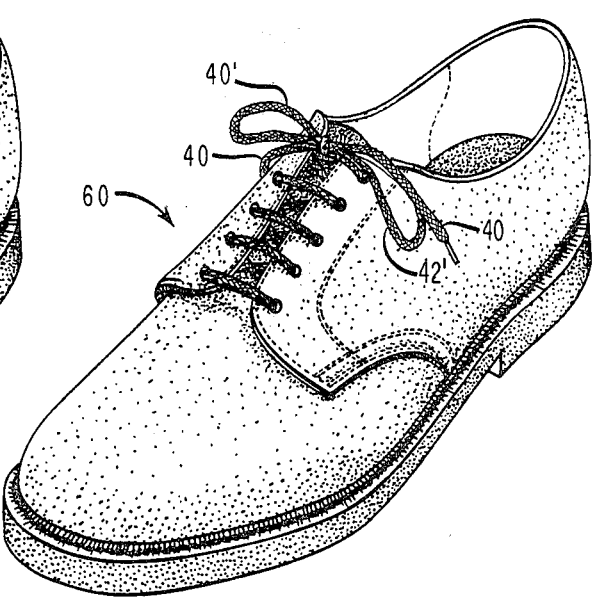

Next, loop 42', as earlier in the formation of the first overhand knot, is crossed over loop 40' and then around and under, as indicated in FIG. 3(c). The two loops 40', 42' are then pulled at the same time in a direction away from one another, toward and in alignment with the ends 42,40, respectively. Thus, the double bow knot is fixed. Finally, device 10 is removed from the knot, the edges of slit 30 being far enough apart and sufficiently flexible to permit the double bow knot to be pulled through it.

As will be appreciated, device 10 can be used in a similar fashion to tie the lace of the other shoe. The device can be used over and over again until the child learns to tie the double bow knot. Its construction is so simple and economical that it can be easily and cheaply provided as an aid for tying one's shoes, or in other applications in forming a double bow knot, for as long as help is needed.

As many different embodiments of this invention will now occur to those skilled in the art, it is to be understood that the specific embodiments of the invention as presented herein are intended by way of illustration only and are not limiting on the invention, but that the limitations thereon are to be determined only from the appended claims.

What I claim is:

1. Device useful in tying a double bow knot in a length of material comprising a planar-shaped body member, a first pair of spaced-apart openings in and extending through said body member, an elongated narrow opening in and extending through said body member and connecting said first pair of spaced-apart openings, a second pair of openings spaced-apart a greater distance from one another than said first pair and located on an imaginary line in alignment with said elongated narrow opening, said second pair of openings being located equidistantly from each of said first pair of openings, said second pair of openings being unconnected by slits with said first pair of openings.

2. Device useful in tying a double bow knot in a length of material according to claim 1 wherein the planar-shaped body member is of rectangular configuration.

3. Device useful in tying a double bow knot in a length of material according to claim 1 wherein the openings are circular-shaped.

4. Device useful in tying a double bow knot in a length of material according to claim 3 wherein the first pair of circular-shaped openings are of a greater diameter than the second pair.

5. Device useful in tying a double bow knot in a length of material according to claim 3 wherein the circular-shaped openings are all the same diameter sufficient to accommodate a double thickness of the material being tied.

6. Device useful in tying a double bow knot in a length of material according to claim 4 wherein the said material is a shoe string and the diameter of the first pair of openings is sufficient to relatively snugly accommodate a double thickness of shoe lace, and the diameter of the second pair of openings is sufficient to accommodate only a single thickness of lace.

* * * * *